US012342767B2

(12) United States Patent
Claus et al.

(10) Patent No.: US 12,342,767 B2
(45) Date of Patent: Jul. 1, 2025

(54) VALVE ASSEMBLY FOR AN IRRIGATION SYSTEM

(71) Applicant: HUSQVARNA AB, Huskvarna (SE)

(72) Inventors: Ralf Claus, Illerkirchberg (DE); Markus Maag, Ulm (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/836,602

(22) PCT Filed: Dec. 13, 2022

(86) PCT No.: PCT/EP2022/085581
§ 371 (c)(1),
(2) Date: Aug. 7, 2024

(87) PCT Pub. No.: WO2023/147923
PCT Pub. Date: Aug. 10, 2023

(65) Prior Publication Data
US 2025/0160270 A1    May 22, 2025

(30) Foreign Application Priority Data
Feb. 7, 2022   (EP) ..................... 22155458

(51) Int. Cl.
*A01G 25/16* (2006.01)
*F16K 7/04* (2006.01)
*F16K 31/00* (2006.01)

(52) U.S. Cl.
CPC ............. *A01G 25/167* (2013.01); *F16K 7/04* (2013.01); *F16K 31/001* (2013.01); *Y10T 137/189* (2015.04)

(58) Field of Classification Search
CPC .. A01G 25/167; A01G 27/003; F16K 31/001; F16K 7/04; Y10T 137/189
See application file for complete search history.

(56) References Cited

U.S. PATENT DOCUMENTS 3,204,872 A  *  9/1965  Whear ................. A01G 25/167
                                                      340/602
3,426,539 A  *  2/1969  Whear ................. A01G 25/167
                                                      405/37

(Continued)

FOREIGN PATENT DOCUMENTS

| CN | 100365328 C | 1/2008 |
|---|---|---|
| CN | 102330821 B | 7/2013 |

(Continued)

OTHER PUBLICATIONS

International Search Report and Written Opinion for corresponding International Application No. PCT/EP2022/085581 mailed Apr. 3, 2023, all pages cited in its entirety.

(Continued)

*Primary Examiner* — David Colon-Morales
(74) *Attorney, Agent, or Firm* — Burr & Forman LLP

(57) ABSTRACT

A valve assembly (300) is adapted to be coupled with a flexible pipe (200). The valve assembly (300) includes a hollow body (310) defining a first end (320) and a second end (330). A porous body (350) partially encloses the hollow body (310) proximate to the first end (320) and houses a swellable material (344). The hollow body (310) further defines a hollow chamber (340) between the first and second ends (320, 330). A piston (346) is disposed within the hollow chamber (340). The piston (346) is adapted to move between a first position (P1) and a second position (P2) corresponding to a contraction and an expansion of the swellable material (344). The valve assembly (300) selectively allows passage of water through the flexible pipe (200) based on the positions (P1, P2) of the piston (346). The irrigation system (100) is characterized in that the valve assembly (300) further includes an elastic diaphragm (380) disposed (Continued)

between the swellable material (344) and the piston (346). The elastic diaphragm (380) includes an annular bead (382).

5 Claims, 4 Drawing Sheets

(56) References Cited

U.S. PATENT DOCUMENTS

| | | | |
|---|---|---|---|
| 4,015,616 A | 4/1977 | Hanff | |
| 4,095,458 A * | 6/1978 | Wild | G01N 19/10 405/37 |
| 4,121,608 A * | 10/1978 | MacLeod | A01G 27/003 47/79 |
| 4,182,357 A * | 1/1980 | Ornstein | F16K 7/04 251/4 |
| 4,214,701 A * | 7/1980 | Beckmann | G01N 19/10 405/37 |
| 4,682,730 A | 7/1987 | Smeyers | |
| 4,696,319 A * | 9/1987 | Gant | A01G 25/167 200/61.04 |
| 4,843,758 A * | 7/1989 | Raczkowski | A01G 27/005 47/79 |
| 5,113,888 A | 5/1992 | Beggs | |
| 5,148,825 A * | 9/1992 | Gil | A01G 25/167 239/63 |
| 5,273,066 A * | 12/1993 | Graham | A01G 25/167 137/78.3 |
| 5,329,081 A * | 7/1994 | Jones | H01H 35/42 200/61.04 |
| 5,656,032 A | 8/1997 | Kriesel et al. | |
| 5,794,848 A * | 8/1998 | Nunn | F16K 31/001 239/63 |
| 6,570,109 B2 * | 5/2003 | Klinefelter | H01H 35/42 200/61.07 |
| 6,782,909 B1 * | 8/2004 | Ragless | G01N 33/246 239/63 |
| 7,121,338 B2 | 10/2006 | Van Zuilekom et al. | |
| 7,506,658 B2 * | 3/2009 | Guest | F16K 31/001 251/12 |
| 8,245,720 B2 | 8/2012 | Grill et al. | |
| 8,371,325 B1 * | 2/2013 | Grizzle | F16K 31/001 47/79 |
| 8,979,431 B2 * | 3/2015 | Bayley | A01G 25/02 405/37 |
| 9,228,670 B2 * | 1/2016 | Grizzle | F16K 31/001 |
| 9,462,762 B2 * | 10/2016 | Sheets | A01G 25/167 |
| 9,491,913 B2 * | 11/2016 | Mayer | A01G 25/167 |
| 10,091,956 B2 * | 10/2018 | Gietl | A01G 25/167 |
| 10,757,873 B2 * | 9/2020 | Weiler | G05B 19/048 |
| 11,009,142 B2 * | 5/2021 | Emory | F16K 7/17 |
| 11,330,772 B2 * | 5/2022 | Sol | A01G 25/167 |
| 2002/0124880 A1 * | 9/2002 | Tanikawa | A01G 27/003 137/78.3 |
| 2005/0087231 A1 * | 4/2005 | Sanders | F16K 31/001 137/489.5 |
| 2017/0332566 A1 | 11/2017 | Emory et al. | |

FOREIGN PATENT DOCUMENTS

| | | | | |
|---|---|---|---|---|
| CN | 103301978 A | | 9/2013 | |
| DE | 7823915 U1 | | 1/1979 | |
| DE | 2835093 C3 | | 5/1981 | |
| DE | 10104690 C2 | | 7/2003 | |
| EP | 0004159 B1 | | 11/1985 | |
| EP | 1155319 B1 | | 7/2008 | |
| EP | 2585744 B1 | | 2/2018 | |
| EP | 3027940 B1 | | 5/2020 | |
| GB | 2017868 A | | 10/1979 | |
| JP | 2004187510 A | * | 7/2004 | |
| JP | 2007271026 A | | 10/2007 | |
| JP | 5451567 B2 | | 3/2014 | |
| WO | WO-8604212 A1 | * | 7/1986 | |
| WO | WO-9801021 A1 | * | 1/1998 | A01G 25/167 |
| WO | 9804915 A1 | | 2/1998 | |
| WO | WO-03013220 A2 | * | 2/2003 | A01G 27/003 |
| WO | WO-2012001380 A1 | * | 1/2012 | A01G 27/003 |
| WO | 2017083673 A1 | | 5/2017 | |

OTHER PUBLICATIONS

International Preliminary Report on Patentability for corresponding International Application No. PCT/EP2022/085581 completed Jan. 31, 2024, all pages cited in its entirety.

* cited by examiner

VALVE ASSEMBLY FOR AN IRRIGATION SYSTEM

TECHNICAL FIELD

The present disclosure relates to an irrigation system, and more particularly to a valve assembly for the irrigation system.

BACKGROUND

Irrigation systems may be used to provide controlled watering to vegetation zones and specific plants. These systems may often employ controllers using timed schedules. Sensors may also be used to provide data used to modify the irrigation schedules in conjunction with the controllers or to override the irrigation schedules independent of the controllers based on environmental conditions, such as weather data or moisture.

One common type of sensor is a moisture sensor. Moisture sensors may be used in conjunction with the controllers and valves to control irrigation based on moisture measurements in an irrigation surface. For example, the moisture sensor for the valve may be embedded in the irrigation surface (say a ground) and may sense the moisture content in the irrigation surface about the valve. If the moisture content is sufficient, the moisture sensor may maintain the valve in a closed position thereby shutting off flow of water for irrigation. On the other hand, if the moisture content is insufficient for the vegetation, the moisture sensor may open the valve and may permit water to flow downstream to the irrigation emission devices.

However, the irrigation system as described above may involve complex electronic circuitry and may further require skilled operators for the set-up and operation of the irrigation system. Further, the irrigation system may be expensive.

Hence, there is a need for the irrigation system that may be cost-effective and simple in operation. The irrigation system may involve a valve using hydrophilic materials that may react quickly to the changing moisture conditions in the irrigation surface. The hydrophilic materials may expand or swell rapidly when in contact with the moisture. The expansion of this material may cause a valve element to move toward and eventually seat against a valve seat to shut off the water supply when there is sufficient moisture in the irrigation surface. However, when the water content of the irrigation surface may dry, the material may contract and allow the valve element to move, such as under the bias of spring, away from the valve seat to open the valve to permit water to flow.

An example of such an irrigation system is provided by the Japanese patent application 2004/187,510 (hereinafter referred to as '510 reference). The '510 reference provides a dripping water supply valve that opens and closes in accordance with dryness or wetness of soil. The valve includes a cylinder that allows only water to come in and go out. The cylinder is charged with a water-absorptive expanding material. Further, the cylinder is thrusted into soil so that the water-absorptive expanding material absorbs moisture in the soil to expand and push a piston, and thereby, a flexible pipe to stop water flowing in the flexible pipe. Further, when the soil dries up with time, the water-absorptive expanding material dries up to shrink, and water flows out with repulsion of the flexible pipe. However, there is still a need to prevent leakage of the water-absorptive expanding material for an efficient working of the valve and thus the controlled irrigation of the irrigation surface, such as, but not limited to, a ground surface.

A further example of an irrigation system is provided by the PCT patent application WO 86/04212 A1 (hereinafter referred to as '212 reference). The '212 reference provides a device for controlling a water supply, wherein the device comprises a hollow body having a first end and a second end, wherein a rod is coupled to the first end via a diaphragm, and a porous element is coupled to the second end. The porous element and the hollow body are coupled such that water may be sealingly contained inside. Dependent on the humidity of the surrounding of the device, water may flow through the porous element out of the device and may thereby cause under pressure inside the device such that the rod may be moved towards the second end and may cause a water supply through a flexible pipe connected to the device. However, the '212 reference solely teaches the person skilled in the art to use water. Moreover, the '212 reference unambiguously teaches that other swellable materials, particularly solid swellable materials, may be disadvantageous and have therefore to be replaced by water. Hence, the '212 reference falls short to describe an irrigation system comprising swellable material. Additionally, the '212 reference does not describe that the swellable material is operatively coupled with the hollow body proximate to the first end via the elastic diaphragm. Hence, there is still a need to prevent leakage of the swellable material for an efficient working of the valve and thus the controlled irrigation of the irrigation surface, such as, but not limited to, a ground surface.

SUMMARY

In view of the above, it is an objective of the present invention to solve or at least reduce the drawbacks discussed above. The objective is at least partially achieved by a valve assembly. The valve assembly is adapted to be coupled with a flexible pipe. The valve assembly is further adapted to allow passage of the flexible pipe therethrough. The valve assembly selectively allows passage of water through the flexible pipe. The valve assembly further includes a hollow body defining a first end and a second end. A porous body partially encloses the hollow body proximate to the first end. The porous body houses a swellable material such that the swellable material is operatively coupled with the hollow body proximate to the first end. Further, a screw element is coupled to the hollow body proximate to the second end. The hollow body further defines a hollow chamber between the first end and the second end such that a piston is disposed within the hollow chamber. The piston is adapted to move between a first position and a second position corresponding to a contraction and an expansion of the swellable material. The valve assembly allows passage of water from the flexible pipe in the first position of the piston and the valve assembly disallows passage of water from the flexible pipe in the second position of the piston. The irrigation system is characterized in that the valve assembly further includes an elastic diaphragm disposed between the swellable material and the piston. The elastic diaphragm further includes an annular bead.

Thus, the irrigation system of the present disclosure advantageously provides the self-regulating moisture sensitive valve assembly for controlled watering of the irrigation surface. The valve assembly includes the piston that reciprocates corresponding to the contraction and the expansion of the swellable material. The swellable material expands when exposed to the moisture in the irrigation surface and contracts when the moisture is absent in the irrigation surface. The valve assembly selectively allows watering of the irrigation surface based on the position of the piston in the valve assembly. The valve assembly includes the elastic diaphragm to seal or prevent leakage of the swellable material. The valve assembly is cost-effective and simple in operation.

According to an embodiment of the present disclosure, the hollow body includes an annular groove for receiving the annular bead. The annular groove may prevent the annular bead from any lateral or longitudinal movement relative to an axis along which the piston reciprocates. Thus, the annular bead efficiently seals the swellable material for efficient operation of the valve assembly and hence the irrigation system.

According to an embodiment of the present disclosure, the swellable material is countable. The swellable material is advantageously spherical or multi-faceted so that it easily counted or weighed for application with the valve assembly of the present disclosure.

According to an embodiment of the present disclosure, a material of the porous body is selected from one or more of a clay or ceramic material. The material of the porous body may be any inexpensive moisture-permeable material.

According to an embodiment of the present disclosure, the porous body includes a conical cross-section. The conical cross-section may allow an operator to embed the porous body easily and conveniently in the irrigation surface.

Other features and aspects of this invention will be apparent from the following description and the accompanying drawings.

BRIEF DESCRIPTION OF THE DRAWINGS

The invention will be described in more detail with reference to the enclosed drawings, wherein.

DESCRIPTION OF EMBODIMENTS

Figure 1:
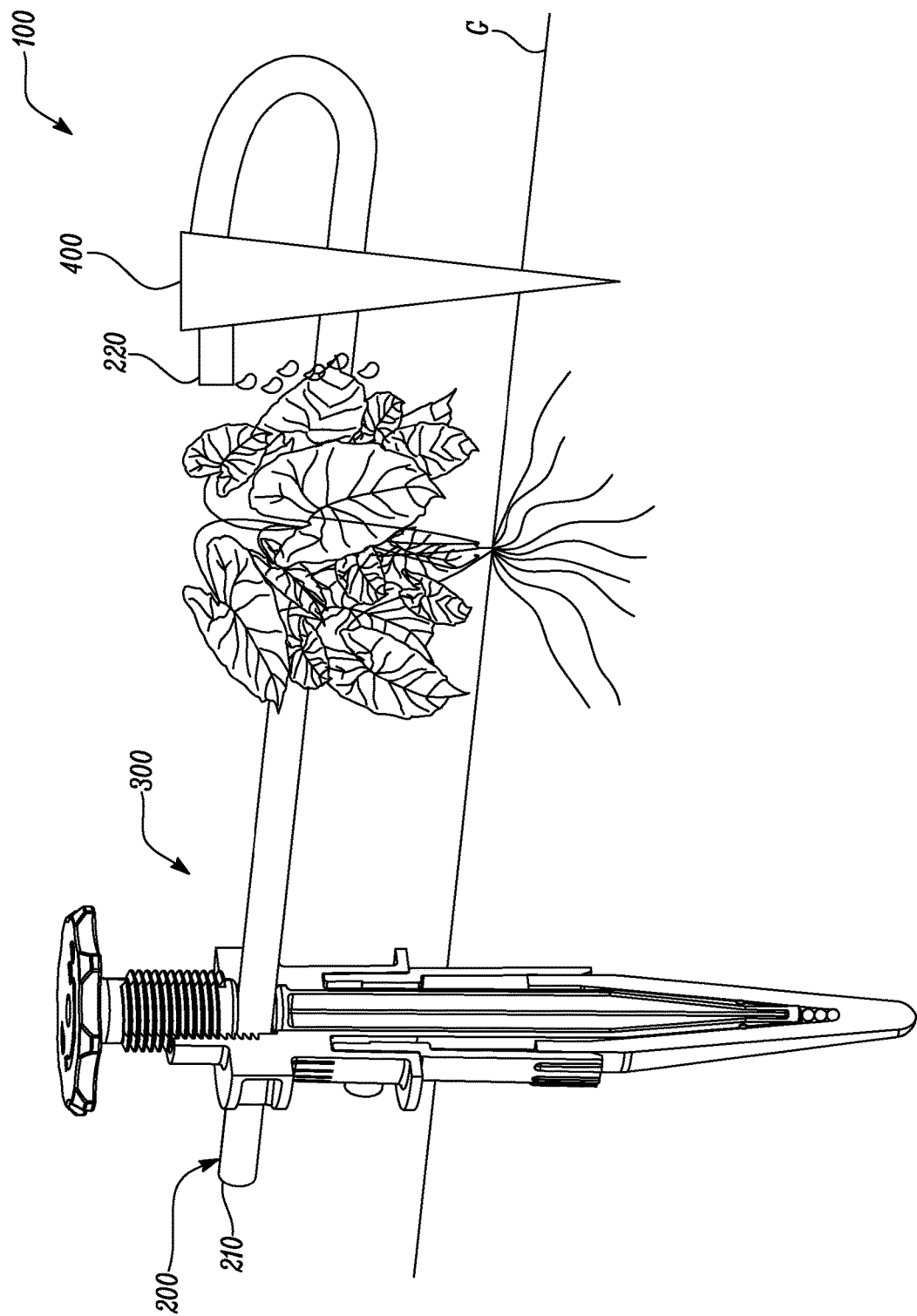
FIG. 1 illustrates an irrigation system, in accordance with an aspect of the present disclosure.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention may be utilized in other embodiments and even other types of structures and/or methods. In the drawings, like numbers refer to like elements.

Certain terminology is used herein for convenience only and is not to be taken as a limitation on the invention. For example, "upper", "lower", "front", "rear", "side", "longitudinal", "lateral", "transverse", "upwards", "downwards", "forward", "backward", "sideward", "left", "right," "horizontal," "vertical," "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

FIG. 1 illustrates an irrigation system 100 that may be used to provide controlled watering to an irrigation surface "G". The irrigation surface "G" may be a garden surface, a lawn surface, a crop field surface, a ground surface, a flowerpot surface, and the like. The irrigation surface "G" may be any surface that may support a vegetation or a plantation. The irrigation system 100 includes a water source (not shown) adapted to supply water to the irrigation surface "G". In some embodiments, the water source may be a tap. In some embodiments, the water source may be a water reservoir such that the water reservoir may include a pump for pumping water from the water reservoir for use in irrigating the irrigation surface "G". However, the water source of the present disclosure may be any type of water source known and understood in the art without departing form the scope of the present disclosure.

The irrigation system 100 further includes a flexible pipe 200 fluidly coupled to the water source. The flexible pipe 200 includes an inlet end 210 and an outlet end 220. The inlet end 210 is fluidly coupled to the water source. The flexible pipe 200 may be a made from a wide variety of easily available and cost-effective materials such as, but not limited to, plastic, silicone, and the like. The flexible pipe 200 may be a made from the material that may provide tough, sturdy but flexible built to the flexible pipe 200. The flexible pipe 200 of the present disclosure may preferably be the silicone hose.

Further, as illustrated in FIG. 1, a valve assembly 300 is adapted to allow passage of the flexible pipe 200 therethrough. The valve assembly 300 is a self-regulating moisture-sensitive valve assembly 300. The valve assembly 300 selectively allows passage of water through the flexible pipe 200 based on detection of the moisture in the irrigation surface "G". The valve assembly 300 uses the osmosis principle for the working. The valve assembly 300 has a very simple and cost-effective construction and does not employ any actual electronic based moisture sensor, or any complex electronic circuitry. The valve assembly 300 of the present disclosure may require minimal or no maintenance whatsoever.

With continued reference to FIG. 1, the outlet end 220 of the flexible pipe 200 supplies water to the irrigation surface "G" when passage of water through the flexible pipe 200 is allowed by the valve assembly 300. The outlet end 220 is supported by a stake 400. In some embodiments, the outlet end 220 may be connected to a drip-irrigator (not shown). In some embodiments, the outlet end 220 may be connected to a sprinkler (not shown).

The valve assembly 300, as mentioned above, plays a pivotal role in the working of the irrigation system 100. The construction of the valve assembly 300 is illustrated in FIG.

2. The valve assembly 300 includes a hollow body 310. The hollow body 310 has a shape similar to a pencil used for writing purposes. The hollow body includes an upper part 310A and a bottom part 310B. The upper part 310A is cylindrical in shape. The lower part 310B is shaped like a tip of the pencil. The lower part 310B is shaped like a tapering cylinder such that the diameter of the lower part 310B continuously decreases. The hollow body 310 defines a first end 320 and a second end 330. The first end 320 and the second end 330 each define a hole (not shown) such that the diameter of the hole corresponding to the second end 330 is greater than the diameter of the hole corresponding to the first end 320.

The hollow body 310 further defines a hollow chamber 340 between the first end 320 and the second end 330. Further, the hollow body 310 includes a first annular protrusion 332 and a second annular protrusion 334 proximate to the second end 330. A distance between the second end 330 and the second annular protrusion 334 is greater than a distance between the second end 330 and the first annular protrusion 332 when measured along an axis X-X'. The first annular protrusion 332 and the second annular protrusion 334 shields some part of the hollow chamber 340. The first annular protrusion 332 and the second annular protrusion 334 partially shields the hollow chamber 340. The first annular protrusion 332 and the second annular protrusion 334 are concentrically placed relative to the hollow chamber 340.

An operator may place his/her hands between the first annular protrusion 332 and the second annular protrusion 334 for gripping the body 310 of the valve assembly 300. The operator may then conveniently and ergonomically apply force for embedding the valve assembly 300 in the ground surface "G". The first annular protrusion 332 and the second annular protrusion 334 may advantageously remain outside the ground surface "G" when the valve assembly 300 is embedded in the ground surface "G". This may allow the operator to take out the valve assembly 300 from the ground surface "G". In some embodiments, the space between the first annular protrusion 332 and the second annular protrusion 334 may be covered with any known and commonly available soft gripping layer that may enhance the gripping ability of the operator.

The first annular protrusion 332 includes a pair of diametrically opposite circular holes 333. The diametrically opposite circular holes 333 allows passage of the flexible pipe 200 through the hollow chamber 340 of the valve assembly 300.

Figure 2:
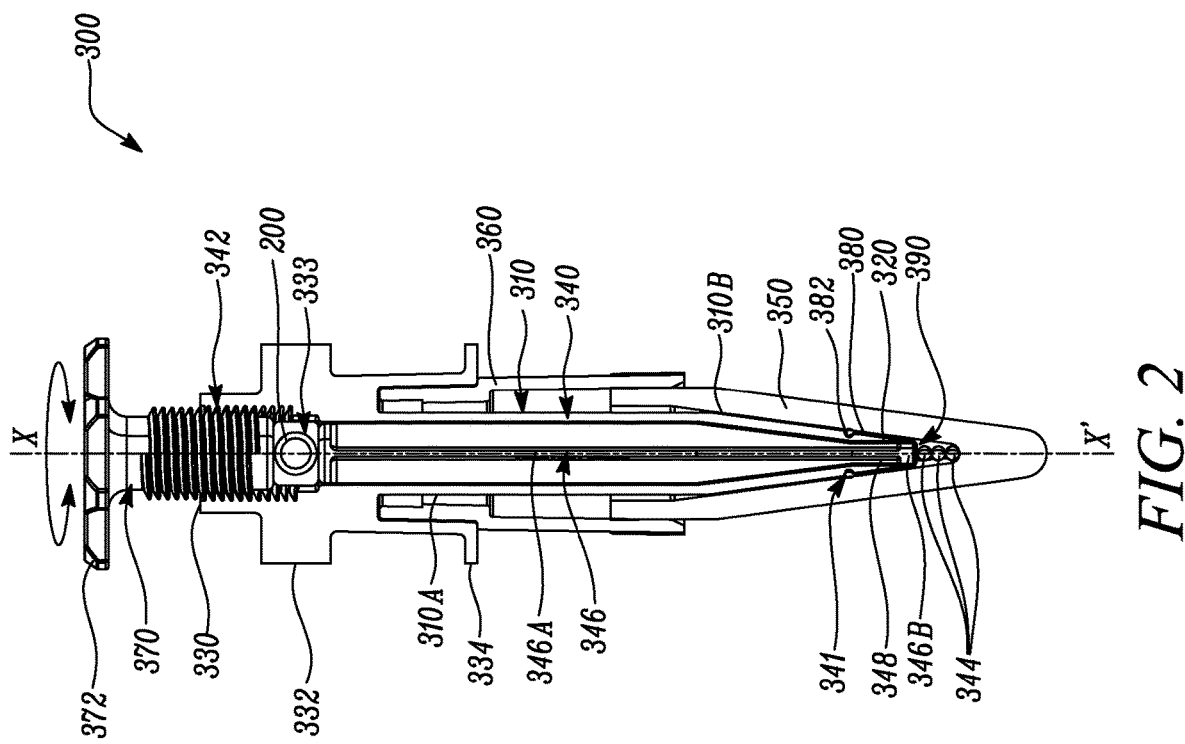
FIG. 2 illustrates a cross-sectional front view of a valve assembly, in accordance with an aspect of the present disclosure.

As further illustrated in FIG. 2, a porous body 350 encloses the hollow body 310 or the hollow chamber 340 proximate to the first end 320. The porous body 350 partially encloses or shields the hollow chamber 340 of the valve assembly 300. The porous body 350 is coupled to the hollow body 310 using a flange 360. The coupling between the porous body 350 and the flange 360 may be implemented by any means known and understood in the related art. Further, the coupling between the flange 360 and the hollow body 310 may also be implemented by any means known and understood in the related art. The flange 360 may also provide additional strength to the valve assembly 300. The porous body 350 allows osmosis of the moisture from beneath the ground surface "G" towards the hollow chamber 340.

The porous body 350 includes a conical cross-section (as shown in FIG. 2). The conical cross-section of the porous body 350 may allow the operator to embed the porous body 350 and a substantial portion of the body 310 of the valve assembly 300 easily and conveniently in the irrigation surface "G". In some embodiments, the material of the porous body 350 is selected from one or more of a clay or ceramic material. The material of the porous body 350 however may be any inexpensive moisture-permeable material.

The porous body 350 further houses a swellable material 344 such that the moisture in the irrigation surface "G" is passed on to the swellable material 344 via the porous body 350. The swellable material 344 is disposed within the hollow chamber 340 towards the first end 310. The swellable material 344 is disposed within the porous body 350 such that the swellable material 344 is disposed proximate to the bottom of the hollow chamber 340 of the hollow body 310. The swellable material 344 is operatively coupled with the hollow body 310 or the hollow chamber 340 towards or proximate to the first end 320. The swellable material 344 expands when it receives moisture present in the irrigation surface "G". Further, the swellable material 344 contracts when there is no moisture in the irrigation surface "G".

The swellable material 344 is advantageously spherical or multi-faceted so that it may be easily counted or weighed for application with the valve assembly 300 of the present disclosure. The quantity of the swellable material 344 may depend on the operational requirements of the present disclosure, housing space within the porous body 350, size of the swellable material 344, among other factors. The swellable material 344 may be made from a polymer such that it may be super-absorbent and may have the ability to expand and contract.

In some embodiments, the swellable material 344 may be made from a hydrogel, which may have a maximum swelling (at 20° C.) of up to 10 times its dry size i.e., when the hydrogel may be exposed to the moisture in the irrigation surface "G", the hydrogel may expand up to 10 times its actual size.

The hydrogels may be of natural or synthetic organic or inorganic material. They may normally be made of water-soluble backbone materials which may be rendered insoluble by the introduction of covalent or physical cross-links e.g. addition polymers of hydroxy alkyl(meth)acrylates, methyl vinyl ether, (meth)-acrylamide, N-vinyl pyrrolidone, (meth)acrylic acid and its salts, N-vinyl and C-vinyl pyridines and salts thereof with poly(meth)acrylates such as glycol dimethacrylate. There may also be used crosslinked natural polymers such as collagen or starch and cellulose derivatives, and crosslinked synthetic polymers such as polyvinyl alcohol.

Useful hydrogels for the present disclosure may include a crosslinked poly(ethylene glycol or ethylene oxide). Suitable crosslinked materials may be prepared by reacting poly(ethylene oxide) or poly(ethylene glycol) with a polyol (e.g. 1,2,6-hexantriol) and a polyisocyanate (e.g. diphenylmethane 4,4'-diisocyanate). Further there may be used insoluble domains (block copolymers of e.g. polyethylene oxide with water-insoluble urethane blocks) or materials rendered insoluble by entanglement crosslinking (high molecular weight poly(ethylene oxides)) with divinylbenzene or by crystallinity (cellulosic materials and polyvinyl alcohols). The most preferred hydrogel for use according to the present disclosure may be a cross linked, partially crystalline poly(ethylene oxide).

With continued reference to FIG. 2, a piston 346 is disposed within the hollow chamber 340. The piston 346 has a shape similar to a pencil used for writing purposes. The piston includes an upper part 346A and a bottom part 346B. The upper part 346A is cylindrical in shape and has a diameter marginally less than the hole defined by the second end 330 of the hollow body 310. The lower part 346B is shaped like a tip of the pencil. The lower part 346B is shaped like a tapering cylinder such that the diameter of the lower part 346B continuously decreases. The taper is such that the diameter of the portion of the lower part 346B proximate to the first end 320 has a diameter marginally less than the hole defined by the first end 320 of the hollow body 310.

Figures 3A, 3B:
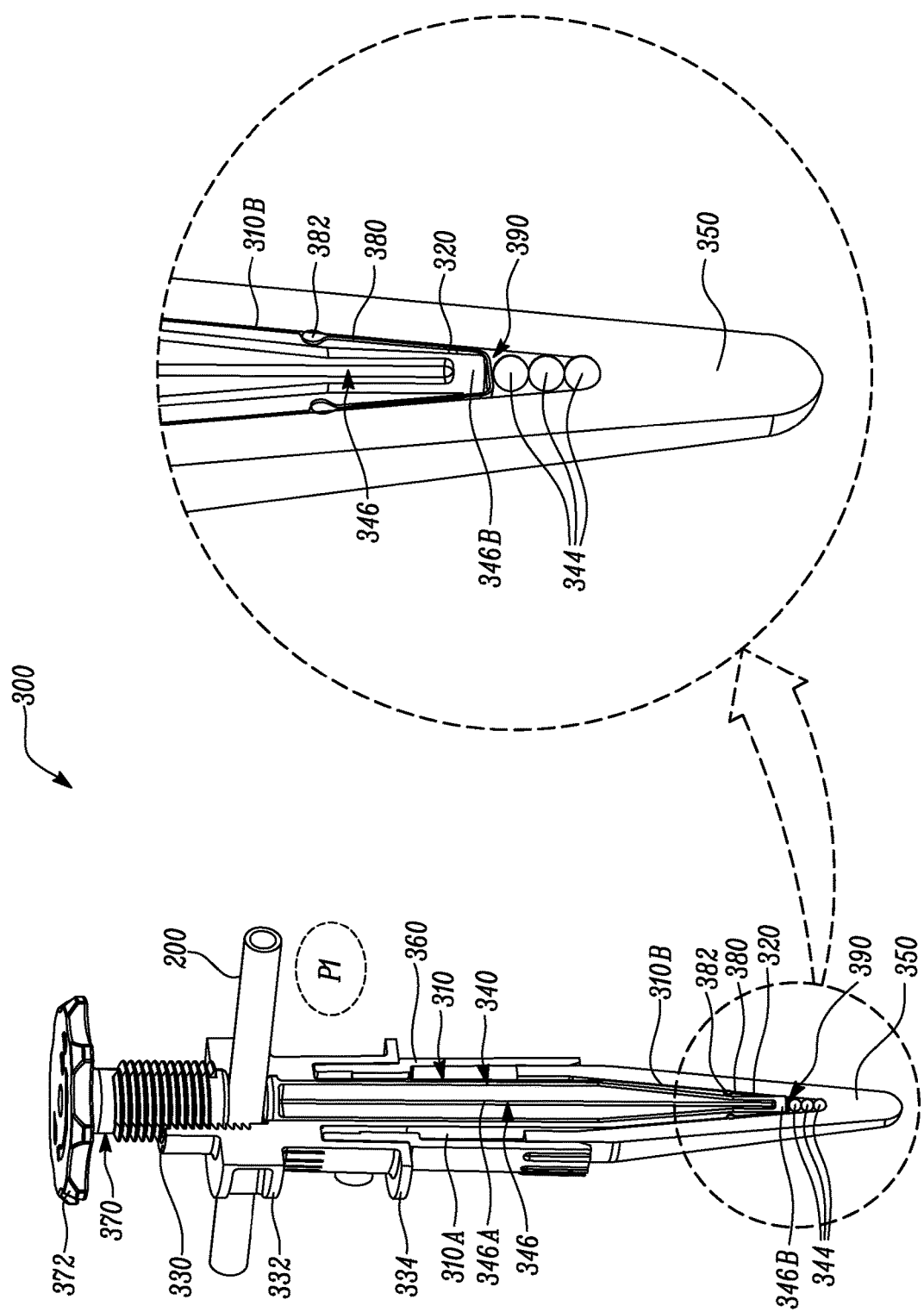
FIG. 3A illustrates a cross-sectional view of a valve assembly with a piston in a first position, in accordance with an aspect of the present disclosure.
FIG. 3B illustrates a partially zoomed in view of a valve assembly with a piston in a first position, in accordance with an aspect of the present disclosure.
Figures 4A, 4B:
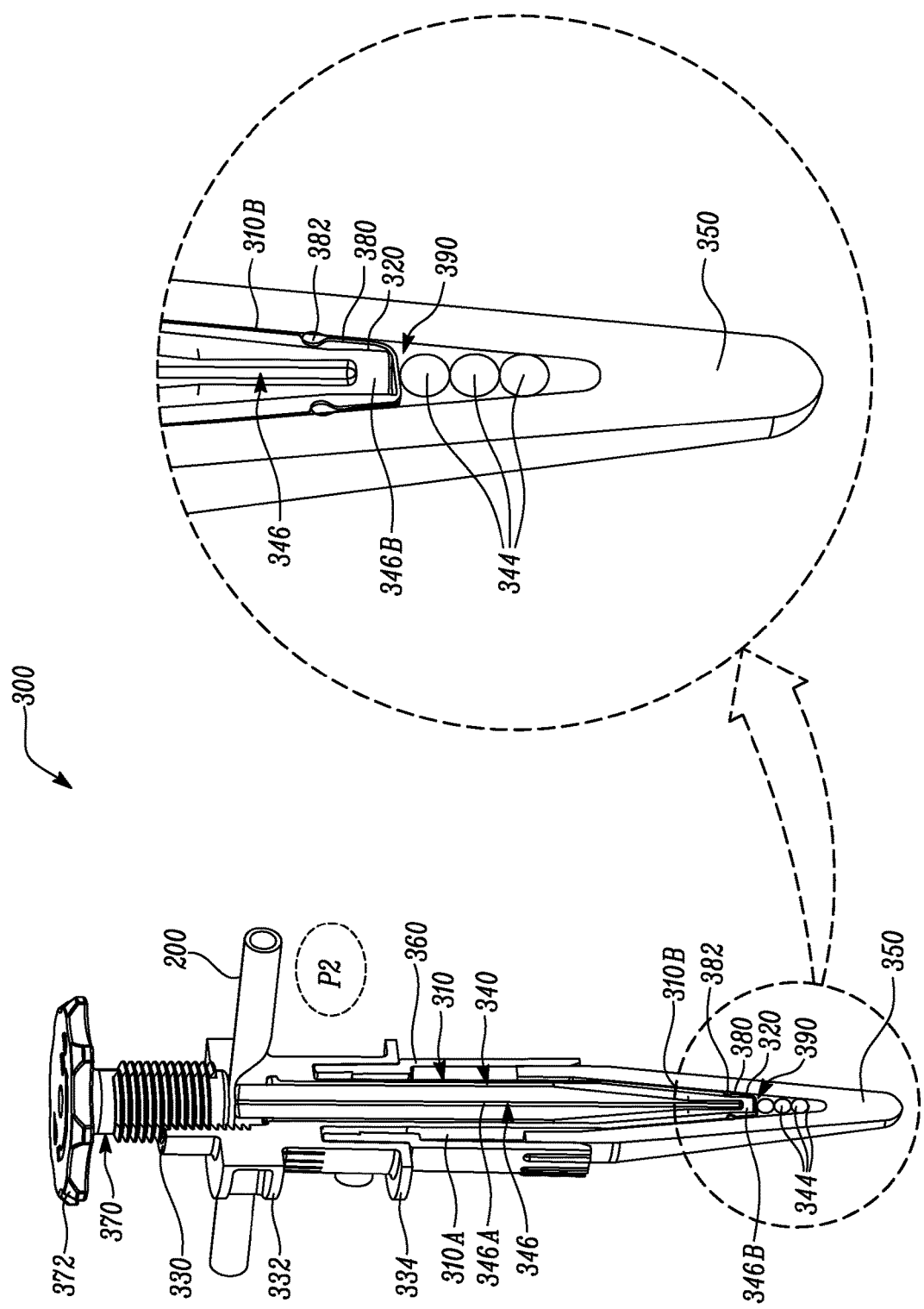
FIG. 4A illustrates a cross-sectional view of a valve assembly with a piston in a second position, in accordance with an aspect of the present disclosure.
FIG. 4B illustrates a partially zoomed in view of a valve assembly with a piston in a second position, in accordance with an aspect of the present disclosure.

The piston 346 is adapted to move between a first position "P1" (as shown in FIGS. 3A and 3B) and a second position "P2" (as shown in FIGS. 4A and 4B) corresponding to the contraction and the expansion of the swellable material 344. In the first position "P1", the piston 346 marginally surpasses the hole defined by the first end 320 of the hollow body 310 such that the piston 346 is closer to the swellable material 344. Further, the movement of the piston 346 is guided along the X-X' axis by a linear guide 348 installed in the hollow chamber 340 of the hollow body 310.

The valve assembly 300 allows passage of water from the flexible pipe 200 in the first position "P1" of the piston 346 and the valve assembly 300 disallows passage of water from the flexible pipe 200 in the second position "P2" of the piston 346. In the second position "P2" of the piston 346, the piston 346 pricks, presses or squeezes the flexible tube 200 such that the flow passage for the water in the flexible tube 200 is blocked. In the second position "P2" of the piston 346, the piston 346 deforms the flexible tube 200 or narrows the circular cross-section of the flexible tube 200 such that the flow passage for the water in the flexible tube 200 is blocked. In the first position "P1" of the piston 346, the piston 346 does not pricks or presses the flexible tube 200 and thus the flow passage for the water in the flexible tube 200 is not blocked. In the first position "P1" of the piston 346, the piston 346 does not deforms the flexible tube 200 and thus the flow passage for the water in the flexible tube 200 is not blocked.

The valve assembly 300 further includes an elastic diaphragm 380 disposed between the swellable material 344 and the piston 346. The porous body 350 houses the elastic diaphragm 380 such that the elastic diaphragm 380 is positioned between the swellable material 344 and the piston 346. The swellable material 344 is operatively coupled to the hollow body 310 towards the first end 320 via the elastic diaphragm 380. The swellable material 344 is operatively coupled to the piston 346 via the elastic diaphragm 380. The elastic diaphragm 380 is in direct contact with the swellable material 344 as well as the piston 346. The elastic diaphragm 380 fits against the hollow body 310.

The elastic diaphragm 380 may elastically deform due to the expansion and the contraction of the swellable material 344. The elastic diaphragm 380 further acts as a boundary wall between the swellable material 344 and the piston 346 and thus a chamber 390 is formed which houses the swellable material 344. The chamber 390 is located within the porous body 350. The chamber 390 is sealed by the elastic diaphragm 380 such that the swellable material 344 may not leak through the chamber 390. The elastic diaphragm 380 may be made from any suitable and easily available elastic material known in the art.

The elastic diaphragm 380 further includes an annular bead 382. The elastic diaphragm 380 includes the annular bead 382 about its perimeter to seal the chamber 390. The annular bead 382 is well received in an annular groove 341. In some embodiments, as shown in FIG. 2, the annular groove 341 is included in an outer surface of the hollow body 310 such that the outer surface faces the inner side of the porous body 350. In some embodiments, the annular groove 341 may be included in an inner surface of the hollow body 310 such that inner surface faces the piston 346 in the hollow chamber 340.

The annular bead 382 of the elastic diaphragm 380 securely engages with the annular groove 341. The annular bead 382 is sandwiched between the perimeter of the elastic diaphragm 380 and the annular groove 341. The annular bead 382 may generate a strong pretension for sealing the chamber 390 when the swellable material 344 may expand. Further, the annular groove 341 may prevent the annular bead 382 from any lateral or longitudinal movement relative to the axis X-X' along which the piston 346 reciprocates. Thus, the annular bead 382 along with the elastic diaphragm 380 efficiently seals the swellable material 344 for efficient operation of the valve assembly 300 and hence the irrigation system 100.

In some embodiments, the elastic diaphragm 380 and the annular bead 382 are formed in one-piece by any known and understood manufacturing art. In some embodiments, the elastic diaphragm 380 and the annular bead 382 are formed separately and later coupled to each other by any means known and understood in the related art.

In some embodiments, the annular bead 382 may be replaced by a sealing element (not shown) such as, but not limited to, an O-ring, a gasket, or any other similar sealing element suitable for usage with various aspects of the present disclosure. The sealing element may be coupled to the elastic diaphragm 380 by any means known in the art.

In some embodiments, the cross-section of the annular bead 382 may be similar to the cross-section of the annular groove 341. Further, the dimensions of the annular bead 382 may be similar to the dimensions of the annular groove 341. The similarity in the cross-section and the dimensions of the annular bead 382 and the annular groove 341 may lead to secure fitting or secure engagement of the annular bead 382 in the annular groove 341. However, the shape and size of the annular bead 382 and the annular groove 341 may be different as per the application requirement without departing from the spirit of the present disclosure.

In some embodiments, the material of the annular bead 382 may be any commonly available hard, corrosion resistant material known and understood in the art. Further, the material of the annular bead 382 may be such that the annular bead 382 does not damage or deteriorate the porous body 350 over time.

In some embodiments, the annular bead 382 may be friction fitted with the annular groove 341. In some embodiments, the annular bead 382 may be bonded with the annular groove 341 using adhesives. In some embodiments, the annular bead 382 may be bonded with the annular groove 341 using fasteners. However, the bonding between the annular bead 382 and the annular groove 341 may be achieved by any means known and understood in the art.

Further, with continued reference to FIG. 2, a screw element 370 is coupled to the hollow body 310 proximate to the second end 330. The screw element 370 is partially enclosed in the hollow chamber 340. The screw element 370 includes a knob 372. The screw element 370 may be partially screwed in and out of the hollow chamber 340 by turning or rotating the knob 372 in clockwise direction and anti-clockwise direction respectively. The clockwise direction and anti-clockwise direction may be decided in accordance with the top view of the valve assembly 300 as the operator may rotate the knob 372 when viewing from top of the valve assembly 300. Further, the screw element 370 may engage with a threaded surface 342 on the inside of the hollow chamber 340. The threaded surface 342 may extend from the second end 330 approximately to a length such that a part of the threaded portion 342 may partially engage with the flexible pipe 200, when flexible pipe 200 is inserted in the valve assembly 300 such that the flexible pipe 200 passes through the pair of diametrically opposite circular holes 333.

With reference to FIGS. 3 and 4, there is illustrated the operation of the valve assembly 300 of the irrigation system 100. The valve assembly 300 is triggered using the swellable material 344. The valve assembly 300 has an open state (as shown in FIG. 3) that permits water flow and a closed state (as shown in FIG. 4) that prohibits water flow.

The operator grabs the valve assembly 300 with hand and embeds the valve assembly 300 in the irrigation surface "G" in a manner as described above. The flexible pipe 200 that is fluidly coupled to the water source is passed through the valve assembly 300 via the pair of diametrically opposite circular holes 333. The screw element 370 is then screwed into the hollow chamber 340 by rotating or turning the knob 372 in clockwise direction. The screw element 370 is screwed in until the desired humidity of the irrigation is reached. The screw element 370 is screwed into a level such that the screw element 370 touches or presses the flexible pipe 200 so as to allow only a certain quantity of the water to pass through the flexible tube 200 when there is lack of moisture in the irrigation surface "G".

Once the general set-up of the irrigation system 100 is executed, the water source is opened to allow the water to pass through the flexible tube and to the dry irrigation surface "G" via the valve assembly 300. After some time, when there is sufficient moisture in the irrigation surface "G", the moisture in the irrigation surface "G" penetrates through the porous body 350 and causes the swellable material 344 to swell. In this process, the swellable material 344 expands (or alternatively deforms or even becomes a gel-like liquid) in the chamber 390. The chamber 390 is sealed by the elastic membrane 380 and the annular bead 382 such that the swellable material 344 does not leaks. A pressure builds up in the chamber 390 depending upon the humidity in the irrigation surface "G".

The pressure generated by the swellable material 344 upon expansion, presses the piston 346 via the elastic membrane 380. Upon pressing of the piston 346 by the expanded swellable material 344, the piston 346 moves from the first position "P1" (as shown in FIG. 3) towards the second position "P2" (as shown in FIG. 4). In the second position "P2", the piston 346 presses or squeezes the flexible tube 200 such that the water flow through the flexible tube 200 is blocked and hence the valve assembly 300 disallows passage of water from the flexible pipe 200. The irrigation of the irrigation surface "G" is thus stopped. The contact point of the piston 346 with the flexible tube 200 may be rounded or flattened at the edges to avoid damage to the flexible tube.

Further, when the irrigation surface "G" again dries out, the swellable material 344 also dries out and thus contracts again to the original shape and size. The flexible tube 200 thus pushes the piston 346 back from the second position "P2" towards the first position "P1". The flow of water in the flexible tube 200 gets unblocked and hence valve assembly 300 allows passage of water from the flexible pipe 200. The irrigation of the irrigation surface "G" thus starts again.

This interplay may occur within days, which may be conducive to the growth of plants on the irrigation surface "G". In this way, the roots underneath the irrigation surface "G" may be stimulated to grow. Further, judicious use of water may be promoted. Furthermore, there may be no need of spring, as the flexible tube 200 may automatically return the piston 346 back from the second position "P2" towards the first position "P1".

Thus, the irrigation system 100 of the present disclosure advantageously provides the self-regulating moisture sensitive valve assembly 300 for controlled watering of the irrigation surface "G". The valve assembly 300 includes the piston 346 that reciprocates corresponding to the contraction and the expansion of the swellable material 344. The swellable material 344 expands when exposed to the moisture in the irrigation surface "G" and contracts when the moisture is absent in the irrigation surface "G". The valve assembly 300 selectively allows watering of the irrigation surface "G" based on the position "P1, P2" of the piston 346 in the valve assembly 300. The valve assembly 300 includes the elastic diaphragm 380 to seal or prevent leakage of the swellable material 344. The valve assembly 300 is cost-effective and simple in operation.

In the drawings and specification, there have been disclosed preferred embodiments and examples of the invention and, although specific terms are employed, they are used in a generic and descriptive sense only and not for the purpose of limitation of the scope of the invention being set forth in the following claims.

LIST OF ELEMENTS

100 Irrigation System
200 Flexible Pipe
210 Inlet End
220 Outlet End
300 Valve Assembly
310 Hollow Body
310A Upper Part
310B Bottom Part
320 First End
330 Second End
332 First Annular Protrusion
333 Circular Holes
334 Second Annular Protrusion
340 Hollow Chamber
341 Annular Groove
342 Threaded Surface
344 Swellable Material
346 Piston
346A Upper Part
346B Bottom Part
348 Linear Guide
350 Porous Body
360 Flange
370 Screw Element
372 Knob
380 Elastic Diaphragm
382 Annular Bead
390 Chamber
400 Stake
G Irrigation Surface
X-X' Axis
P1 First Position
P2 Second Position

The invention claimed is:

1. A valve assembly adapted to be coupled with a flexible pipe, the valve assembly adapted to allow passage of the flexible pipe therethrough such that the valve assembly selectively allows passage of water through the flexible pipe, the valve assembly further comprising:

a hollow body defining a first end and a second end;

a porous body partially enclosing the hollow body proximate to the first end, wherein the porous body houses a swellable material such that the swellable material is operatively coupled with the hollow body proximate to the first end via an elastic diaphragm;

a screw element coupled to the hollow body proximate to the second end;

wherein the hollow body further defines a hollow chamber between the first end and the second end such that a piston is disposed within the hollow chamber and adapted to move between a first position and a second position corresponding to a contraction and an expansion of a swellable material such that the valve assembly allows the passage of water from the flexible pipe in the first position of the piston and the valve assembly disallows the passage of water from the flexible pipe in the second position of the piston;

wherein the porous body houses the swellable material such that the swellable material is operatively coupled with the hollow body proximate to the first end via an elastic diaphragm, wherein the valve assembly further includes the elastic diaphragm disposed between the swellable material and the piston and in direct contact with the swellable material as well as the piston, and wherein the elastic diaphragm includes an annular bead.

2. The valve assembly of claim 1,
wherein the hollow body includes an annular groove for receiving the annular bead.

3. The valve assembly of claim 1,
wherein the swellable material is countable.

4. The valve assembly of claim 1,
wherein a material of the porous body is selected from one or more of a clay or ceramic material.

5. The valve assembly of claim 1,
wherein the porous body includes a conical cross-section.

* * * * *